(12) United States Patent
Gerard et al.

(10) Patent No.: US 7,046,830 B2
(45) Date of Patent: May 16, 2006

(54) METHOD AND SYSTEM FOR EXTRACTING SPINE GEOMETRICAL DATA

(75) Inventors: Olivier Gerard, Paris (FR); Milena Planells-Rodriguez, Toulouse Cedex (FR); Sherif Makram-Ebeid, Dampierre (FR); Pierre Lelong, Mogent sur Marne (FR); Bert Leo Alfons Verdonck, Retie (BE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 799 days.

(21) Appl. No.: 09/936,824

(22) PCT Filed: Jan. 24, 2001

(86) PCT No.: PCT/EP00/00771

§ 371 (c)(1),
(2), (4) Date: Sep. 18, 2001

(87) PCT Pub. No.: WO01/55965

PCT Pub. Date: Aug. 2, 2001

(65) Prior Publication Data

US 2002/0136437 A1 Sep. 26, 2002

(30) Foreign Application Priority Data

Jan. 27, 2000 (EP) .......................................... 00400217
Sep. 20, 2000 (EP) .......................................... 00402611

(51) Int. Cl.
*G06K 9/00* (2006.01)

(52) U.S. Cl. ........................................ 382/128; 600/594

(58) Field of Classification Search ......... 382/128–134, 382/123, 125, 164, 171, 173, 177, 179, 190; 128/920; 600/407, 419, 512, 549, 425; 378/54–57, 378/3, 98.8, 98.9, 146
See application file for complete search history.

(56) References Cited

U.S. PATENT DOCUMENTS

| 5,079,698 A | * | 1/1992 | Grenier et al. ............... 382/128 |
| 5,359,513 A | * | 10/1994 | Kano et al. ................. 382/128 |
| 5,447,154 A | * | 9/1995 | Cinquin et al. ............. 600/429 |
| 5,483,960 A | * | 1/1996 | Steiger et al. .............. 600/425 |
| 5,577,089 A | * | 11/1996 | Mazess ........................ 378/54 |
| 5,841,833 A | * | 11/1998 | Mazess et al. ............. 378/98.9 |
| 6,301,498 B1 | * | 10/2001 | Greenberg et al. .......... 600/425 |
| 6,366,800 B1 | * | 4/2002 | Vining et al. ............... 600/425 |

FOREIGN PATENT DOCUMENTS

WO    WO9952068    10/1999

OTHER PUBLICATIONS

"Digital Radiography Segmentation of Scoliotic Vertebral Body using Deformable Models" by Claude Kauffmann and Jacques A. de Guise in SPIOE vol. 3034, pp. 243–251.

* cited by examiner

*Primary Examiner*—Kanjibhai Patel
*Assistant Examiner*—Abolfazl Tabatabai

(57) ABSTRACT

A method for extracting geometrical data from a 2-D digital image of the spine, comprising steps for determining spine outlines, endplates and corners wherein:
  digitizing the spine center line and end points;
  constructing a 2-D image band, referred to as Rubber-Band, whose center line is a spline representing the spine center line, and unfolding said Rubber-Band for constructing a 2-D Rectangular-Band;
  processing the 2-D Rectangular-Band image data in order to estimate best paths going through selected points for determining the spine outlines, then the endplates based on the found outline data and the corners at the intersection of the outlines and endplates.

16 Claims, 14 Drawing Sheets

US 7,046,830 B2

METHOD AND SYSTEM FOR EXTRACTING SPINE GEOMETRICAL DATA

The invention relates to an image processing method for extracting geometrical data of a spine image. The invention finds its application in medical imaging.

A segmentation method applied to the spine is already known of the publication "Digital Radiography Segmentation of Scoliotic Vertebral Body using Deformable Models" by Claude Kauffmann and Jacques A. de Guise in SPIE Vol. 3034, pp. 243–251. This publication describes a computer segmentation method based on the active contour model (g-snake) and using a prior knowledge. This method is adapted and used to detect automatically the contour lines of each vertebral body independently in digital radiographs of the scoliotic spine. These contour lines are used to identify correspondent anatomical landmarks for the 3D reconstruction of the scoliotic spine using a bi-planar technique. The steps comprise: constructing a standard template for each kind of vertebrae (thoracic or lumbar), performing three best fits of the appropriate template on the spine radiograph, g-snake energy minimization, selection of a best contour for each vertebra individually, and anatomical landmark extraction (including corners and spine center-line points). Previous steps of digitization of the spine centerline and acquisition of a prior knowledge including the height and width of the standard template are first performed.

It has been found that the method known of the cited document necessitates many interactive corrections, because the actual "best fit" is difficult to select among the "three best fits".

The present invention has for object to propose a method to extract spine data that is easier to carry out and that is more robust. An image processing method that solve this problem as claimed. The present invention has particularly for object to propose a method to extract the spine outlines, the spine endplate projections and the corner projections in an X-ray image of a number of adjacent vertebrae of the spine. An image processing method to solve those problems is claimed in dependent claims. An imaging system, an X-ray apparatus and a computer program product are also claimed to carry out the method.

The extracted geometrical data permits of providing information appropriate to help diagnosing scoliosis even on a single 2-D image. Said data also permits of three-dimensional image reconstruction of the spine from two bi-planar images using a technique of geometric modeling. Three-dimensional images of the spine particularly help diagnosing scoliosis because said disease is a 3-D deformity of the spine.

The invention is described hereafter in detail in reference to diagrammatic figures, comprising:

FIG. 1A, FIG. 1B, FIG. 1C representing a vertebra in various perspectives;

FIG. 2A and FIG. 2B showing the optimal landmarks of a vertebra, respectively in frontal and lateral views;

FIG. 3A, FIG. 3B, FIG. 3C and FIG. 3D illustrating the transformation of a Rubber Band of a frontal image into a Rectangular Band;

FIG. 4 which is a Gradient Map of the ROI in the (u, v) Cartesian referential;

FIG. 5A representing a Gradient Cost Function for a spine outline detection; and FIG. 5B which is a Gradient Cost Map of a ROI for the lower part of FIG. 4;

FIG. 6A illustrating the average width (vertically) and standard deviation from statistical anatomical data of the vertebrae (horizontally); FIG. 6B illustrating the endplates widths and vertebral lengths normalized by the length of the patient spine (thin line) and a derived polynomial of the third degree (thick line); FIG. 6C which illustrates a cost function for the detection of spine outlines;

FIG. 7 showing a centerline and spine outlines on a frontal view;

Figure 9:
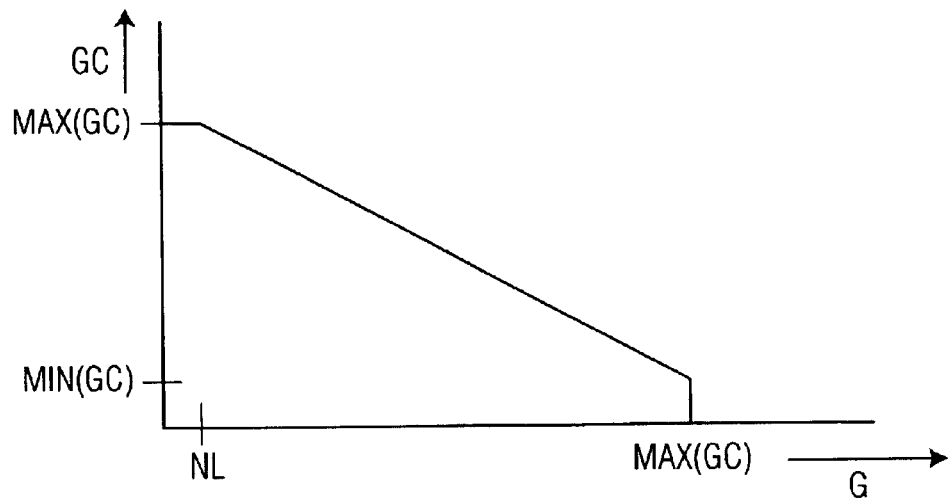
Figure 10:
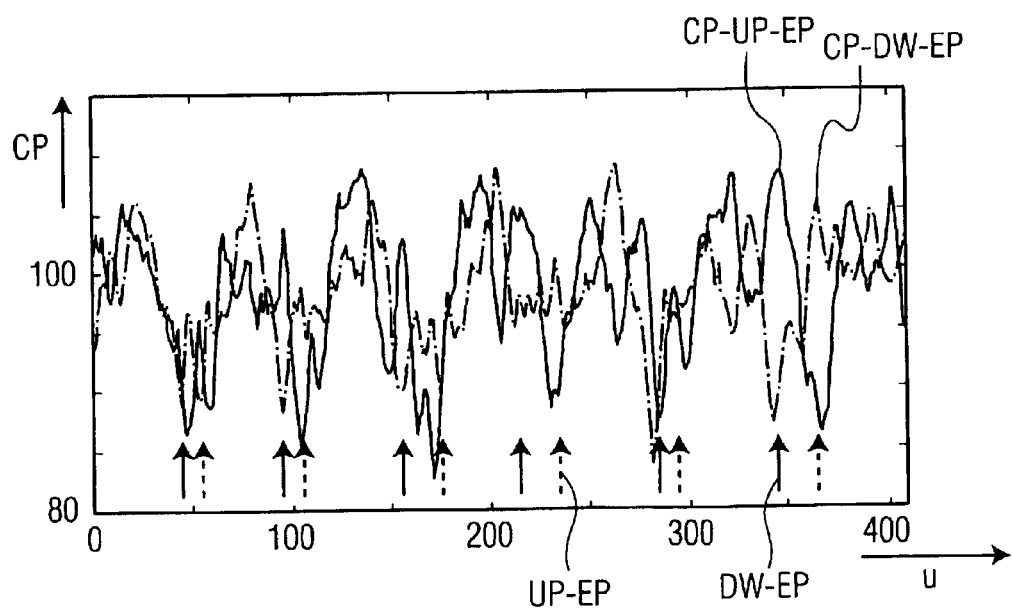
Figure 11A:
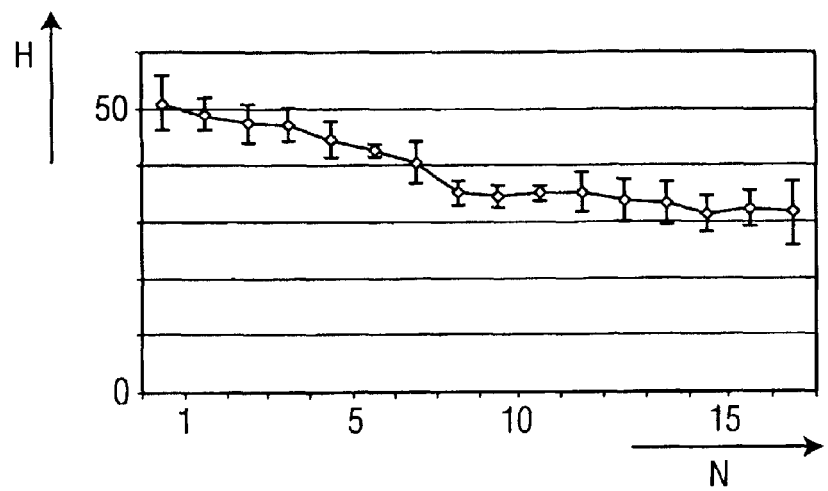
Figure 11B:
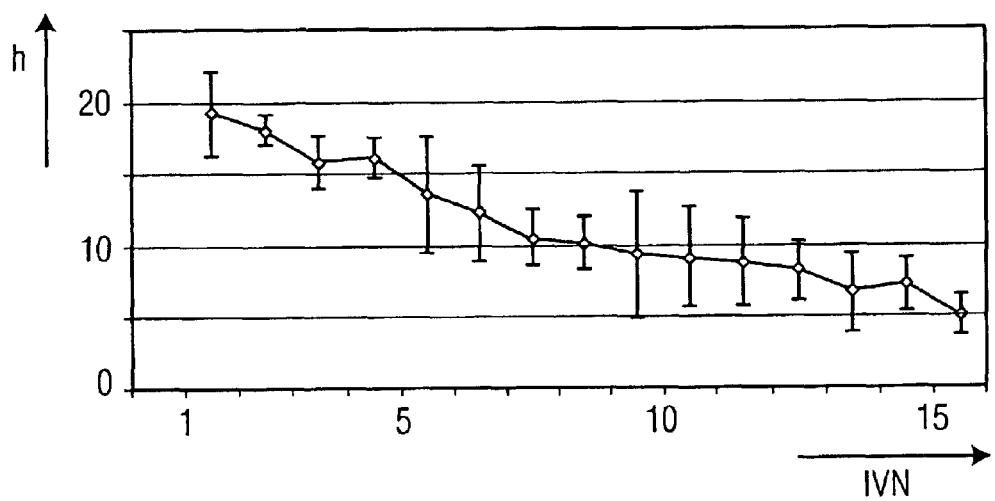
Figure 12A:
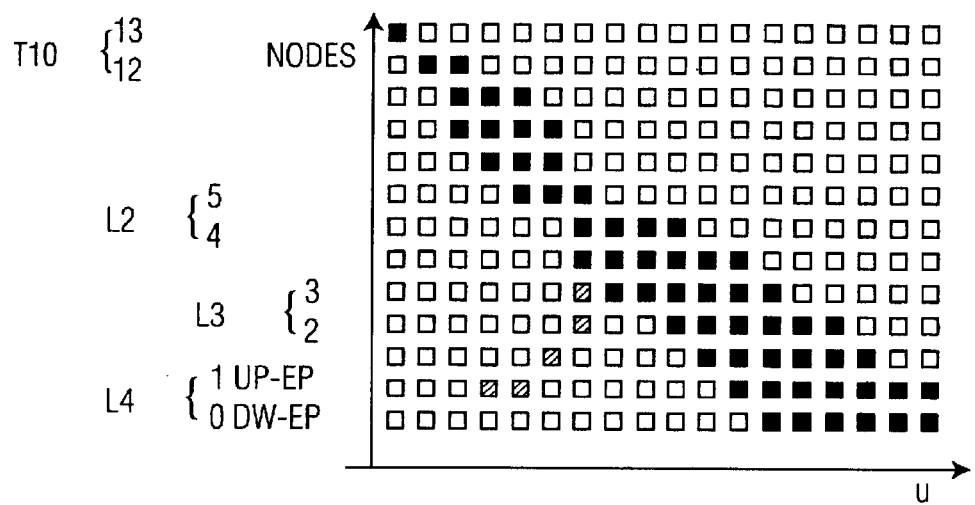
Figure 12B:
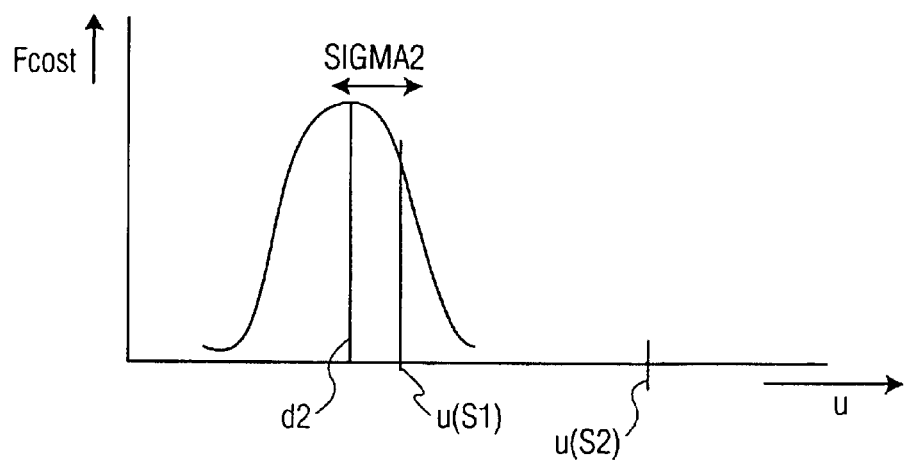
Figure 14:
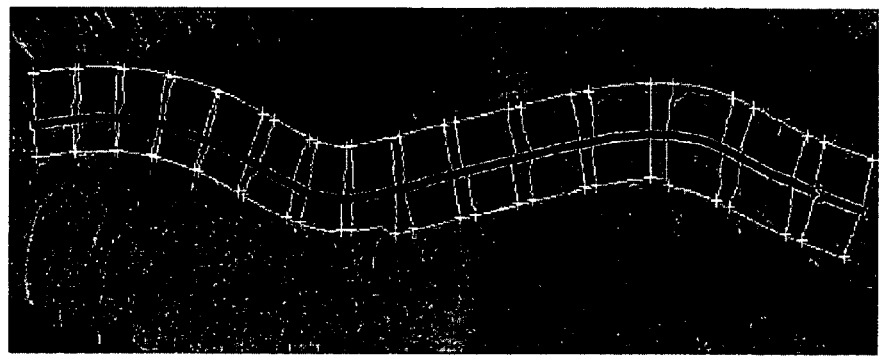
Figure 13B:
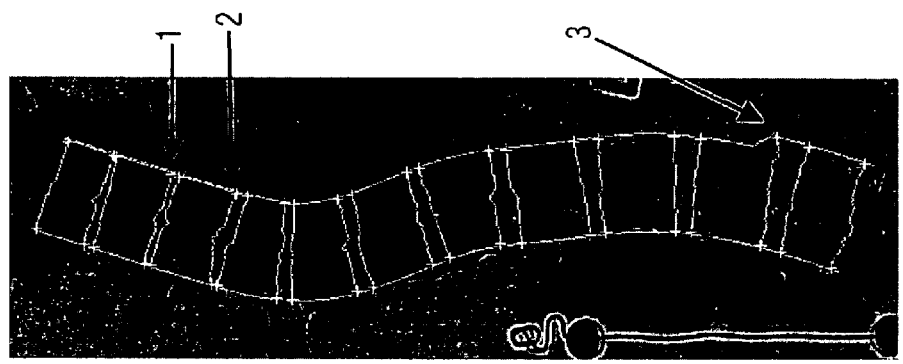
Figure 13A:
Figure 15:
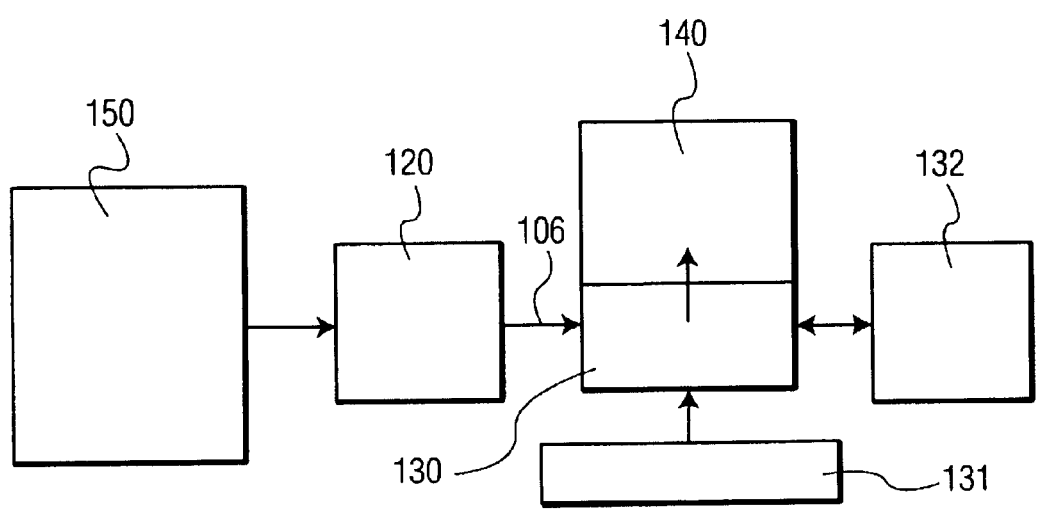

FIG. 9 illustrating a proposed Gradient Cost Function for Endplate Detection;

FIG. 10 showing the Cost Profile in the upward direction (thick line) for finding up-endplates, and in the downward direction (thin line) for finding down-endplates;

FIG. 11A and FIG. 11B showing theoretical location and standard deviation to find the endplates in function of the vertebra number and the inter-vertebra number;

FIG. 12A illustrating an example of initializing a cost matrix; FIG. 12B showing a bell-shaped Cost Function;

FIG. 13A and FIG. 13B showing the results of the outlines and endplates detection before and after the introduction of guide-points;

FIG. 14 illustrating a final result;

FIG. 15 illustrating a functional block diagram of a medical diagnostic imaging system and of an apparatus for carrying out the method.

Figure 1A:
Figure 1B:
Figure 1C:
Figure 2A:
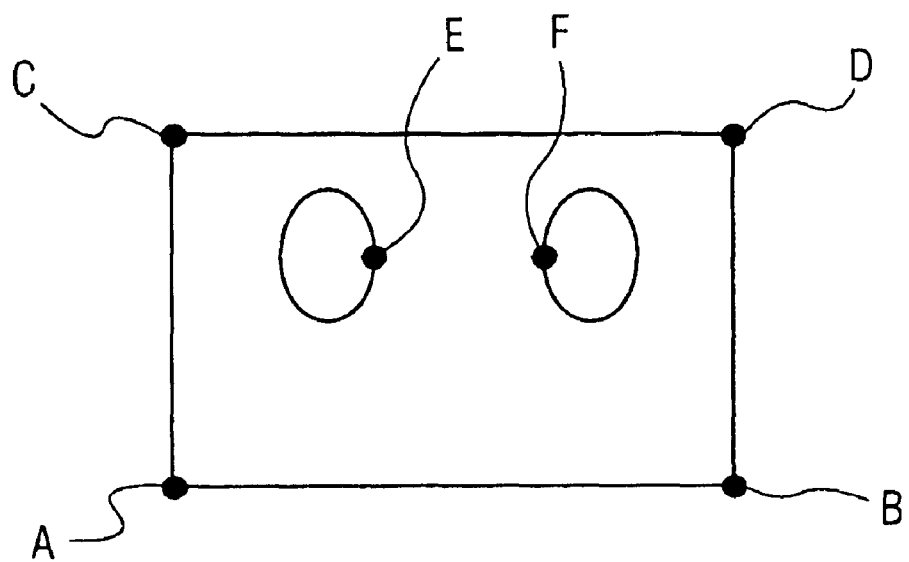
Figure 2B:
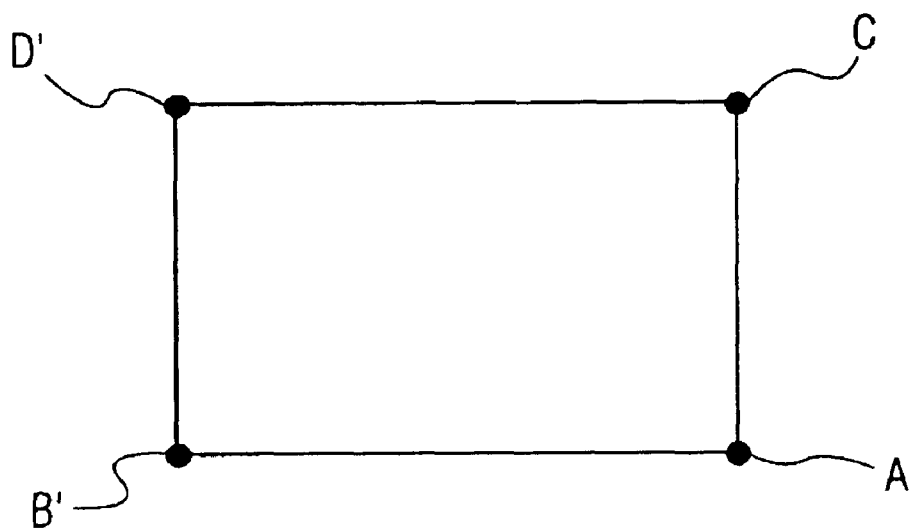

The invention relates to an image processing method for extracting geometrical data of the spine, in order to localize specific elements of the spine in spine images, for studying spine deformities. The specific elements are preferably endplate and vertebrae corner projections. Referring to FIG. 1A to FIG. 1C, which are perspective views of a vertebra, the vertebra shows: a body 7 that is substantially cylindrical with flattened elliptic bases 1, 2 called endplates (FIG. 1A, FIG. 1C); the vertebra body defines the spine axis and the shape of the vertebral discs; a spineous process 4 located in the plane of symmetry of the vertebra (FIG. 1A, FIG. 1B); two transverse processes 3 (FIG. 1A, FIG. 1C); two pedicles 5 located at the bases of the vertebral arches (FIG. 1A, FIG. 1B); the pedicles define the intrinsic rotation of the vertebra around its axis. The localization of these elements is based on the detection of landmarks, which are elements of a spine image having anatomical relevance. A frontal and a lateral views of the spine are sufficient to build the 3-D model of the spine. Six optimal landmarks (for visibility and quality of reconstruction) are selected, as represented in the frontal image shown in FIG. 2A, and in the lateral image shown in FIG. 2B. These landmarks are the extremities of the projection of the vertebra body, which are the corners A, B, C, D, A', B', C', D' of the vertebra shown in FIGS. 2A and 2B; the position of the inner points E, F of the projection of the pedicles, further on called pedicle landmarks, shown in FIG. 2A. Not all the spine may be of interest. A Region Of Interest ROI of for example 16 adjacent vertebrae may be defined.

Figure 3A:
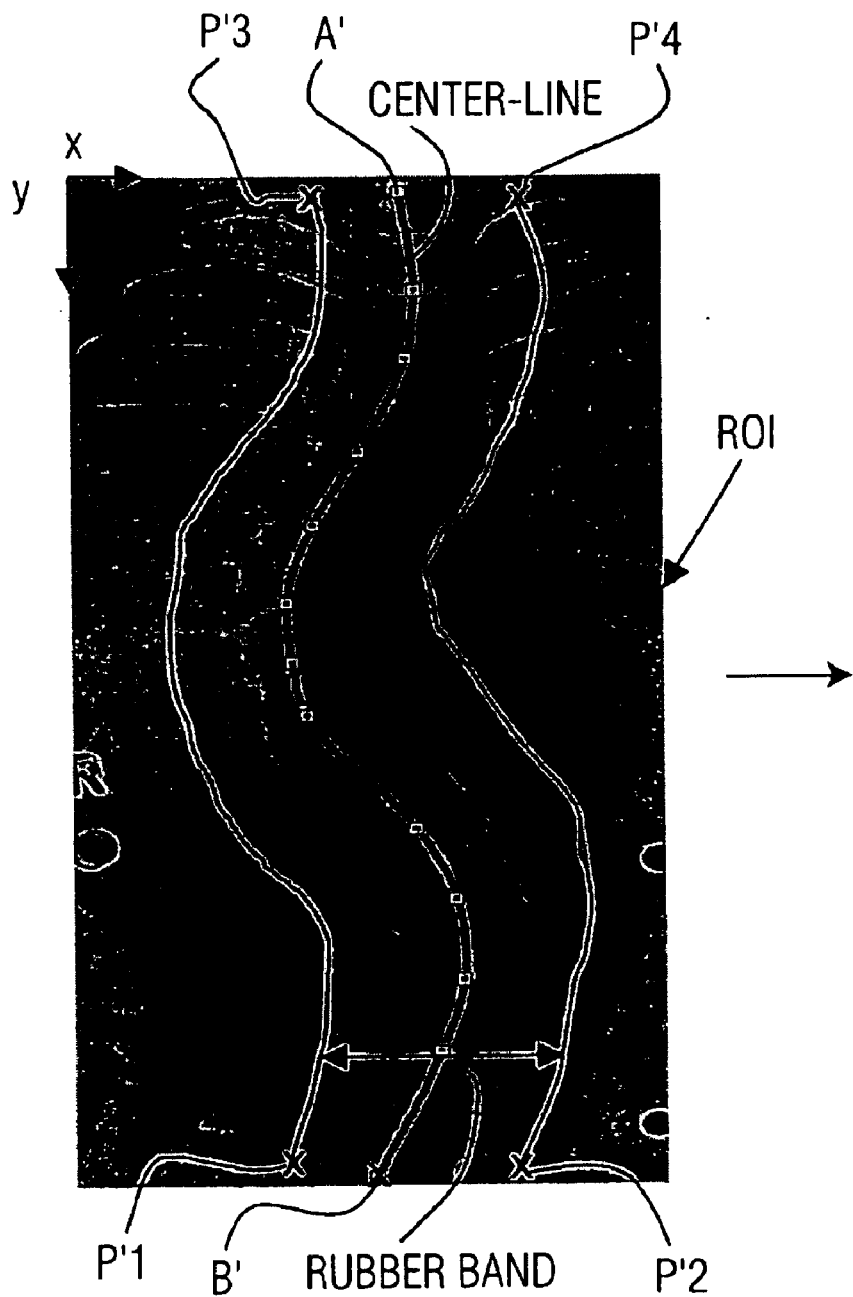

The method comprises steps of:

I) Acquisition of Image Data comprising sub-steps of:

1) Acquiring 2D image data of the spine, preferably of a frontal image and/or of a lateral image of an examined patient. FIG. 3A shows a frontal view formed by x-ray imaging, as an example. Each point has a luminance intensity and coordinates in a cartesian referential x, y.

2) Manual operation of the user, to enter two kinds of guiding data specific to the patient: design data of a "spine centerline" performed on the frontal and/or lateral views; and initial anatomical data of the spine. Referring to FIG. 3A, the centerline data comprises center points located at the centers of the vertebrae in a 2D image and first and second end points A', B' located at the extremities of the spine. The centerline is designed passing through these points. The initial anatomical data comprises the height and reference number of the first and last vertebrae in the Region Of Interest ROI and the total number of vertebrae, for example 16, represented on said ROI. After this manual operation, the spine outline detection is further done automatically using the stored image data, the centerline data and the anatomical data. These further automatic steps of the method are not performed on the original 2D image, but instead on a transformed 2D image.

Figure 3B:
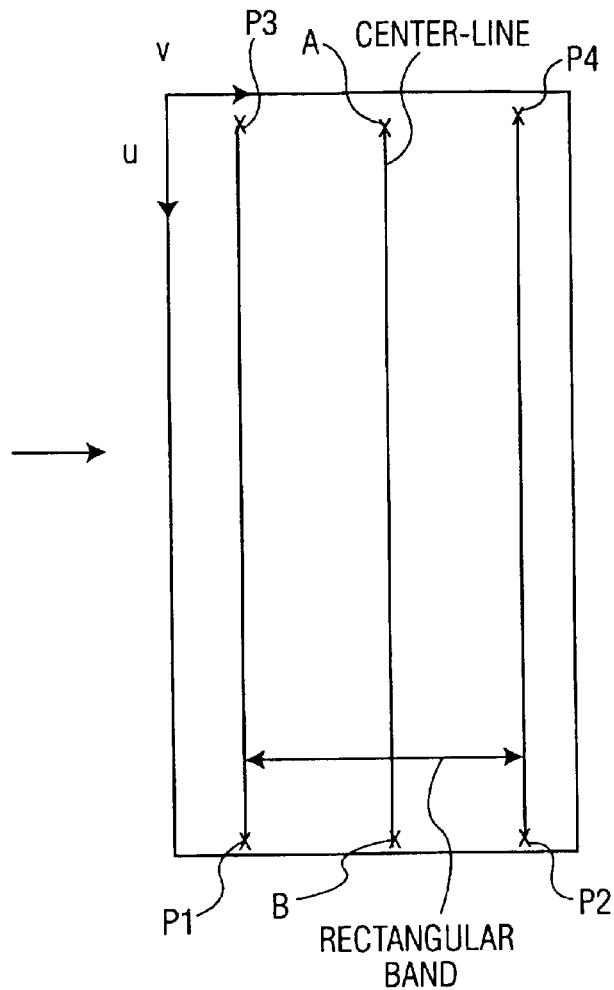
Figure 3C:
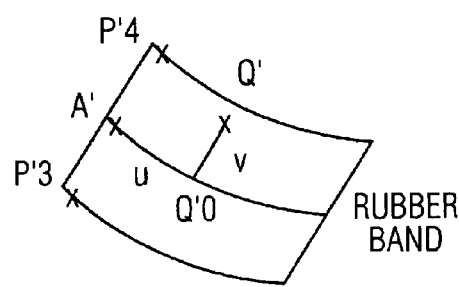
Figure 3D:
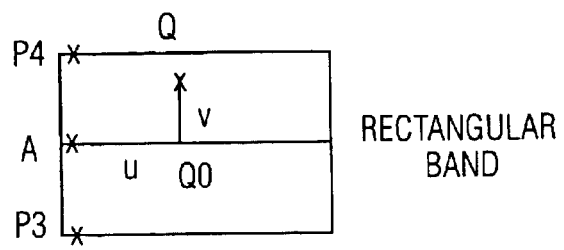

3) Performing an Image Transformation. The Original Image is transformed by first constructing a Rubber-Band, and by secondly unrolling the Rubber-Band for constructing a Rectangular-Band. These operations comprise:

digitizing the spine centerline and end points, as illustrated by FIG. 3A showing the spine original frontal image, using the points of the vertebrae given by the user. Hence, the centerline is a "spline" going through the centers of the vertebrae from the first end point A' to the second end point B';

building a 2-D image band, called "Rubber-Band", whose "centerline" is the spine centerline and whose outlines are parallel to the spine centerline, as illustrated by FIG. 3B. This Rubber-Band has a fixed width larger than the actual width of the spine in the Region Of Interest ROI and a length equal to the predetermined length of the spine centerline in said region, from A' to B'. The extremities of the outlines of the "Rubber Band" are defines by points P'1–P'3 and P'2–P'4;

forming a transformed image band, called "Rectangular-Band", as illustrated by FIG. 3B. This Rectangular-Band is constructed by unfolding the Rubber-Band so as to straighten the "centerline" and make the outlines P1–P3, P2–P4 of the Rectangular-Band parallel to said straighten "centerline". The length of the centerline AB and of the outlines P1–P3, P2–P4 of the Rectangular-Band are equal to the length of the centerline A'B' and of the outlines P'1–P'3, P'2–P'4 of the Rubber-Band.

calculating the coordinates (u, v) of the points of the Rectangular-Band. The Rubber-Band has a Cartesian referential x, y in FIG. 3A and FIG. 3C; and the Rectangular-Band has a Cartesian referential u, v in FIG. 3B and FIG. 3D. In the Rubber-Band of FIG. 3A and FIG. 3C, a given point Q' has first Cartesian coordinates x, y. Said given image point Q' has also curvilinear coordinates, which are the algebraic distance $v=Q'Q_0$ from the point Q' to the spline centerline A'B', and the curvilinear measure $u=A'Q'_0$ along the spline. In the Rectangular-Band of FIG. 3B, the Cartesian coordinates u, v of the corresponding image point Q are defined by said curvilinear coordinates i. e by the measure $QQ_0=v$ of the distance of said Q to its projection point $Q_0$ on the straighten centerline and by the measure $AQ_0=u$ from said projection point $Q_0$ to the end point A of the straighten centerline, labeled origin. The centerline AB and the orthogonal line passing through said origin A, constitute the actual referential u, v of the Rectangular-Band.

determining the intensity of the points in the Rectangular-Band: Referring to FIG. 3C and FIG. 3D that respectively illustrate a part of a Rubber-Band and a corresponding part of a Rectangular-Band, the Rectangular-Band is scanned, for example according to a standard scanning technique, and a Correspondence Table is favorably used for determining the luminance intensity of each scanned point from the luminance intensity of a corresponding point that is looked for in the Rubber-Band. The Correspondence Table is built by calculating the coordinates x, y, in the Rubber-Band, of the point Q' corresponding to the given point Q of coordinates u, v, considered in the Rectangular-Band. The intensity of each point of the Rectangular-Band defined by its coordinates in the u, v referential is determined from the intensity of the corresponding point in the Rubber-Band defined by its coordinates in the x, y referential. The coordinates (x, y) of the point Q'(x, y) together with its luminance intensity are stored in the Correspondence Table for further automatically determining the luminance intensity to apply to each scanned point Q(u, v) in the Rectangular-Band. The Rectangular-Band outlines are also determined in the u, v referential from the x, y referential.

Remark: By entering the centerline, the length of the spine is defined. This information is used to adapt the method of the invention to the current patient. It is equally used for small and high patients; it does not depend on the patient size.

Remark: The image processing method is further on uniquely performed in the transformed image constituted by the Rectangular-Band of FIG. 3B. In particular, this operation of spine outline detection is performed in the Rectangular Band.

Remark: In the detection of the spine outlines, different problems are encountered. As shown in the frontal view of FIG. 3A (or in a corresponding lateral view), the mean gray level is not the same in the high and low parts of the spine image due to the superposition of other organs such as the ribs attached to the thoracic vertebrae that interfere in the edge extraction. Smooth lines are looked for, but the images show the sides of the vertebra having numerous local curvatures with the corners emerging at the extremes and there is a high contrast in the middle of the height of the vertebra (where there are the pedicles) and a lower contrast on the corners. So, smoothing the lines must not be strictly performed for not smoothing out the corners. The user criteria must be accepted as the right ones. Thus, any information entered by the user must overrule the other. The user is always allowed to modify the final results.

Figure 4:

II) Semi-automatic Detection of the spine Outlines on a 2-D image by:

1) Estimating an Outline Cost Map by:

A) Forming a Gradient Cost Map including:

Forming a Gradient Map by extracting the gradients in the rectangular Region of Interest ROI, in the u, v referential. For detecting the outlines of the spine, gradients whose values are maximum in a direction orthogonal to the vertebral line (v direction) are looked for. In FIG. 4, the brighter zones indicate a higher value of the gradient. The gradient values are not discretized, being preferably the actual calculated values. The gradient values are normalized to account for contrast difference along the spine, as appears from the view of FIG. 3A. To perform this step, windows smaller than the ROI are considered. In each window, the gradient values, from the lowest to the highest gradient values, are re-scaled in order to spread over a larger given predetermined range that is the same for all windows. Using this technique, the gradients are both enhanced and normalized. The mean values of the gradient values are the same in the whole image; also, the range of the gradient values is unique.

Constructing the Gradient Cost Map by assigning a Cost Function to the gradients, referred to as Gradient Cost GC. This Gradient Cost function allows to attribute the lowest costs to points having the highest gradient values, and the highest cost to points having the lowest gradient values. A proposed function is:

$$\text{Gradient Cost} = 1/(\text{Gradient}^{0.5})$$

Figure 5A:
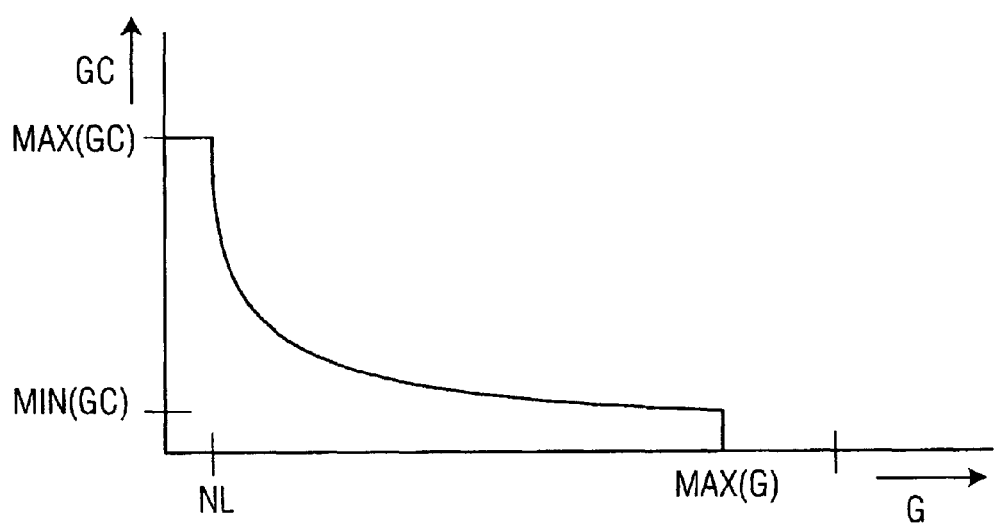
Figure 5B:
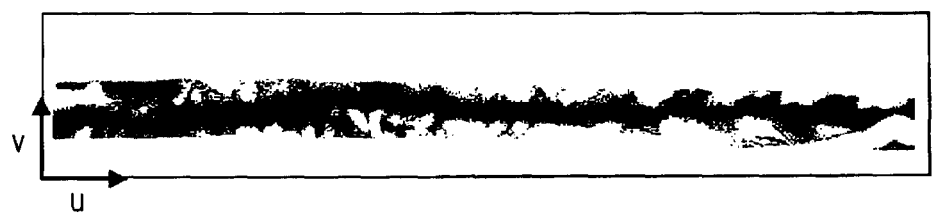

This function is featured in FIG. 5A, where GC is the Gradient Cost, MAX(GC) is the maximum of Gradient Cost and MIN(GC) is the minimum of Gradient Cost, MAX(G) is the maximum of the gradient values G in the range determined by the normalization step and NL is the Noise Level. The Gradient Cost Map is deduced from this Cost Function. FIG. 5B shows a Gradient Cost Map, which corresponds to the lower part of FIG. 4 and the left part of FIG. 3B; the darkest zones represent the minimum costs.

Figure 6A:
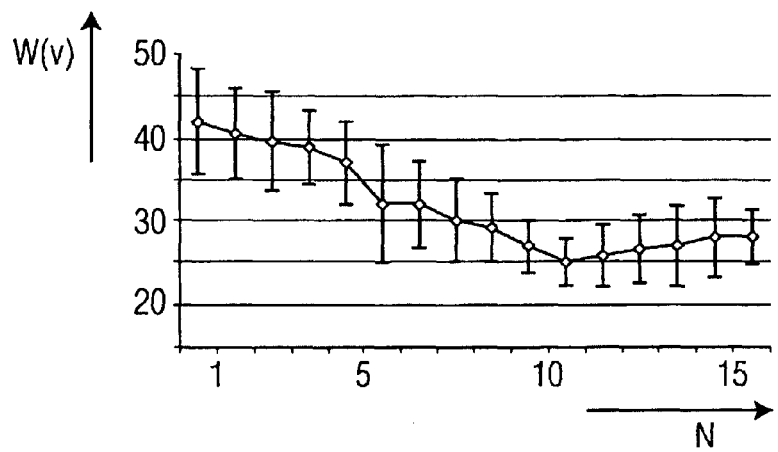

B) Constructing a Prior Knowledge Cost Map by:

Entering prior knowledge data: As the gradient information gives several possible paths for one outline, prior knowledge is incorporated from a statistical database. FIG. 6A illustrates this kind of possible prior knowledge: W(v) is the average vertebra width in the v direction in pixels, and DW is the standard width deviation, N is the number of vertebrae along the u-axis (16 vertebrae).

Figure 6B:
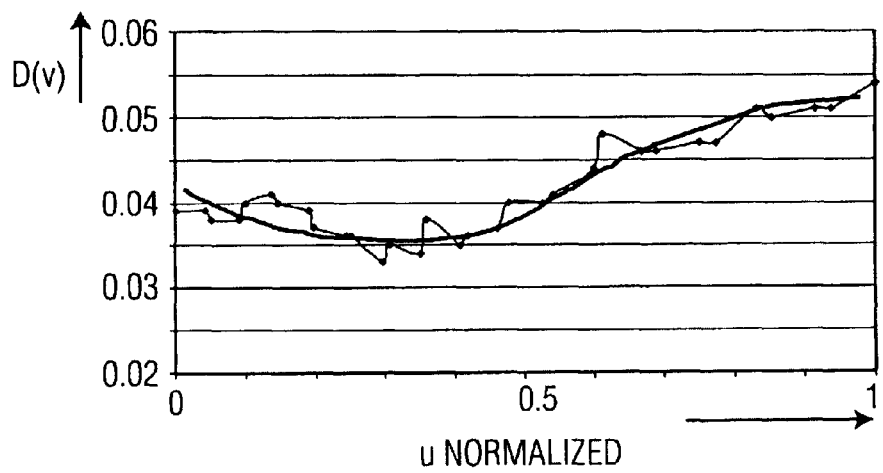

Creating an adaptation function: Given the centerline, the u-axis is normalized to the actual length of the patient spine. The average value of the width W(v) in the v direction permits of determining the average distance D(v) of the corners of the vertebrae with respect to the centerline, which adapts this average data to the current spine length and assigns a distance to the centerline for each point of said centerline in order to locate the outlines, as illustrated by the thin line curve of FIG. 6B. A polynomial of third degree is further determined from the thin line curve of FIG. 6B and shown on the same FIG. 6B represented by a thick line. This polynomial is an adaptation function that interpolates the distance values of the vertebra corners to the centerline for the whole patient spine. Hence, for the left and right outlines, adapted predetermined outlines are deduced that are labeled Prior Knowledge Outlines.

Figure 6C:
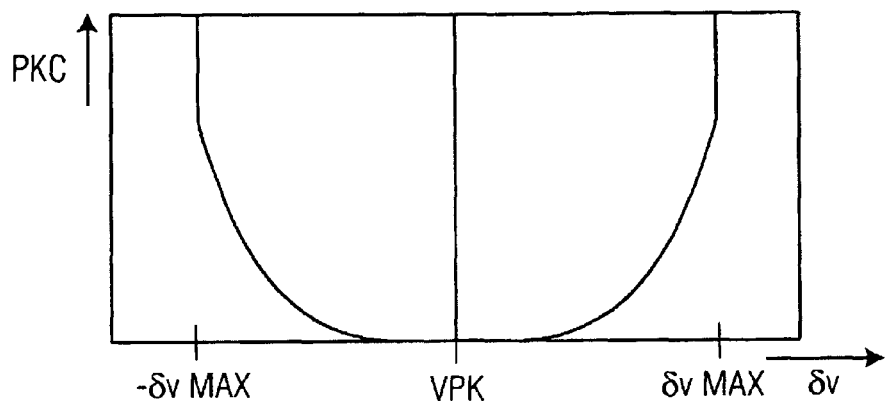

Defining a Prior Knowledge Cost Function: based on the location of these adapted predetermined outlines, a cost function is defined to favor the region of the image where it is more likely to find the outlines of the spine. A Cost, labeled Prior Knowledge Cost, is attributed to the points, said Cost being the lower the nearer the points are of the predetermined outlined. A proposed Cost Function PKC for the detection of spine outlines is represented on FIG. 6C. The value VPK is the point given by the Prior Knowledge of the vertebra width and δv is the distance to it. The curve has a minimum in the region where it is most likely to find the spine side.

Constructing the Prior Knowledge Cost Map: A search area around each of the Prior Knowledge Outlines delimits the more probable position of the outlines. In each area, the points with their Cost constitute said Prior Knowledge Cost Map.

C) Constructing the Outline Cost Map by adding the Gradient Cost Map and the Prior Knowledge Cost Map. There has to be a trade off between the features of the image described by the Gradient Cost Map and the Prior Knowledge Map. So, a weight may be assigned to the Prior Knowledge Cost.

2) Using a DP Algorithm for finding the Outlines: Dynamic Programming (DP) stages are carried out in order to determine the outlines using Energy Functions. This kind of algorithm, which is a non-iterative method effective in contour detection, is not described, as it is well known of those skilled in the art. This step has for a purpose to determine the "most likely path" for the outline points. The points that are to be linked are those that are most likely part of the spine sides. The Dynamic Programming (DP) algorithm is used to calculate a lowest cost path going from a node to another to yield this outline path. The DP is performed in the (u, v) referential in the u direction. For each stage of the DP algorithm, one preferred v position is chosen. The Energy Functions used to calculate the lowest cost to find said best path comprise:

A Local Cost, which is found in the Outline Cost Map.

A Transition Cost, which imposes constraints on the path:

between a node and an adjacent node of the DP algorithm, the path cannot go further than one position both in u and v directions (at an angle of 45 degrees);

a high deviation of the curve is penalized with regard to the previous found points. A gradual change is wanted on the slope of the outline, sudden changes are not wanted because that does not correspond to reality. So, the current point is wanted to depend on the path found so far. Hence, in order to perform this, an exponential window is defined in the path created so far, thus going back in the time (u axis). This window is used to extract an average value that will be used to define the Cost of Transition from one node to another. This method allows local deviation of the spine outline (one corner that emerges) but keeps the line general smoothness. A short size of the window is preferably defined (the vertebra average height is a good value) to keep the curve rigidity and the square of the line slope found so far is integrated all over the window. For instance a Transition Cost may be:

$$\text{Transition Cost} = \overline{\text{slope}^2}$$

Figure 7:
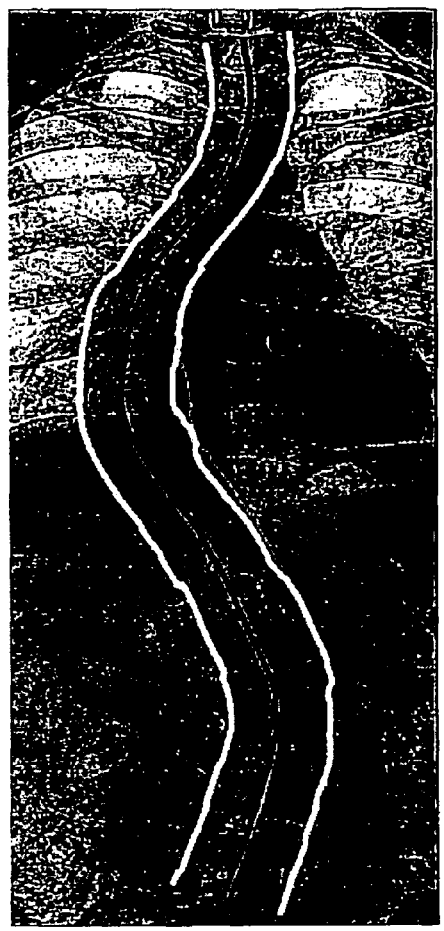
Figure 8A:
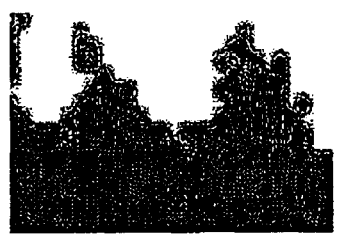
FIG. 8A shows a zoom part of the Cost Map before the introduction of a guide point.
Figure 8B:
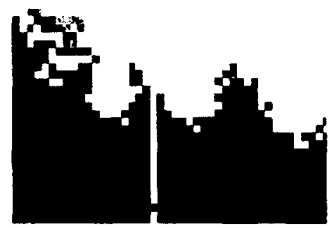
FIG. 8B shows the zoom part of FIG. 8A after introduction of the guide point.

3) Introducing Guide-Points: User interaction is allowed at all steps of the process to iteratively correct the results. FIG. 7 illustrates the center line in black and the found Spine Outlines in white on thee frontal view. The results are quite good, but the user may still want to improve said results. A mechanism is provided to let the user introduce more information in order to change the results by adding further spine data points labeled Guide Points. When the user modifies one point location, the method is carried out again in order to take advantage of the information provided by this modification and find a better result on the whole Region Of Interest ROI of the image instead of only locally, in the neighborhood of the modified point location. Guide points compel the found outlines to go through them. There are 3 kinds of Guide Points: sides, up-corners and down-corners. "Sides" are points lying on the sides of the vertebra, while "up-corners" and "down-corners" correspond respectively to the upper corners and lower corners of the vertebra. When one Guide Point is added, it forces the points around said Guide Point to have a very high Cost value in order to create a minimum of the Resulting Cost Function in the Guide Point, thus imposing the Outline Path to go through said Guide Point. FIG. 8A and FIG. 8B show respectively a zoom part of the Outline Cost Map before the introduction of Guide-Points and after the introduction of Guide-Points. The value of the Cost around the Guide-Point has increased (white line) while the Guide-Point keeps its value (black point). When the Guide-Points are introduced, the Prior Knowledge data must be up-dated in order to incorporate these points to the previously defined Prior Knowledge Outline. This operation is performed by means of two recursive low pass filters (causal and anti-causal) and weighted interpolation. The method is further carried out from the beginning.

Outline Detection Results: The results of the spine outline detection are shown in FIG. 7. The method performs well without the user's interaction in most of the cases. The user interaction allows for real-time user modifications.

III) Endplates detection comprising:

Integration of the detection of the outline and the endplates in the same process: According to the invention, the Endplates Detection depends on the Outline Detection. Based on this principle, information on the Outlines is used to detect the Endplates, the location of the intersections of the Endplates and of the Centerline, and consequently the location of the Corners of the vertebra.

Remark: In the endplates detection, the problems are similar to those found in the outline detection relating to the varying contrast in the images: While on the thoracic vertebrae the contrast is very poor, on the lumbar vertebrae, the contrast is quite high. But the shape of the endplate projection is an ellipse so that two lines are found where only one is expected. One of the worst obstacles is the presence of the pedicles too close to the edges. The gradient level is very high and in the dynamic programming the endplates may be attracted by the pedicles. Besides, the endplates must follow a rather straight line. On the frontal view the direction of the endplates is nearly orthogonal to the vertebral line. However, on the lateral view, its inclination depends on its position along the center line.

The endplate extraction comprises sub-steps of:

1) Extracting the gradients for Endplate Detection and assigning a Cost Function to said gradient: The gradients of the image are extracted in a new Region Of Interest, labeled ROI', delimited by the previously found Outlines. In the detection of the Endplates, it is looked for gradients whose values are now maximum in a direction parallel to the vertebral line (v direction), in the upward direction for the Upper-Endplate and in the downward direction for the Lower-Endplate. The gradients are assigned a Gradient Cost Function GC different of the one used in the spine Outline Detection to be used as Local Cost. A proposed Gradient Cost Function for Endplate Detection is illustrated by FIG. 9. The decrease in the minimum value of the gradient implies a change in the weighing of the cost of the gradient, enhancing the straightness of the endplate.

2) Using a First Dynamic Programming Algorithm DP1, in the (u,v) referential. Using said DP1, and starting from each point of a found Outline of the spine (and for both sides), finding the best path to reach the spine center line. This sub-step is performed twice, using the Gradients calculated for detecting Endplates: first by following the upward edge gradient direction and secondly by following the downward edge gradient direction. This DP1 uses energy functions to calculate the cost of the path that are:

A local cost that is the cost associated to the gradients for Endplate detection, A transition cost with the constraints that the cost of transition of one node to another is the same as the one used in the spine outline detection (the square of the average slope over an exponential window); and that between a stage and an adjacent stage of the DP1 algorithm, the path cannot go further than one position both in u and v directions (an angle of 45 degrees).

An extra-cost that penalizes the difference in the slope of the right and the left path of the endplate. This extra-cost is formed by summing, for both the upward and downward direction of the gradient, the costs of the left and right path. This extra-cost is used to enforce the smoothness of the curve on the centerline.

Two cost profiles are determined along the center line: one for the upward direction, labeled CP-UP-EP, that is a cost profile for finding the location of the up-endplates; and the other for the downward direction, labeled CP-DW-EP that is a cost profile for finding the location of the down-endplates.

Two examples of the cost profiles for the two directions, obtained by this way, are shown in FIG. 10 (vertical axis graduated in pixels). Referring to FIG. 10, the arrows with solid lines show the minimum of the cost profile corresponding to the location of down-endplates DW-EP while the arrows with dashed lines show the minimum of the cost profile corresponding to the location of up-endplates UP-EP. The interesting minimum of the cost profiles are easily distinguished most of the time, but not in every case. Besides, a number of visible minimum are not interesting. The distinction between downward and upward edges is to be done to sort all these minimum.

3) Using a Second Dynamic Programming DP2 and prior knowledge in the extraction of endplates location comprising the selection of all the points of the center line that actually correspond to endplates.

A) User interaction: for introducing the first and last vertebra endplate locations, the number of endplates to find and their anatomical names (L1, L2, L3, T12 . . . ).

B) Labeling nodes: In the different stages of DP2, identifying points of the center-line, called nodes, with the endplate locations numbered from 0 (down-endplate of lowest vertebra) up to 33 (up-endplate of highest vertebra). From now on, this number is named "label" of the node. Thus, if the label of the node is even it corresponds to a down-endplate and if the label is odd it corresponds to an up-endplate.

C) Bringing prior knowledge: Referring to FIG. 11A, for each vertebra, the theoretical height H (in pixels) and standard deviation along the u-axis is given by a database in function of the number N of the vertebra. And referring to FIG. 11B, the average height h (in pixels) of the inter-vertebra disk is defined on the u axis in function of the inter-vertebra number IVN. All the points of this intervertebral interval are given a respective label. This operation permits of defining intervals, along the spine centerline, where it is probable to find an endplate, in the first and the second profiles of FIG. 10, and the standard deviations with respect to said intervals.

D) Extracting the endplates following an up-down direction, from upper vertebra to lower vertebra. When moving on the u axis, progressively the standard deviation of the previous endplates is accumulated. Thus, the interval of possible u for the last endplates is larger than the interval that would correspond to it, if only its own standard deviation were took into account.

As illustrated by FIG. 12A, a Cost Matrix is used for:

assigning a label of first endplate to the first node, and labeling progressively the nodes to the last endplate, thus determining by accumulating standard deviations, several nodes to said last endplate;

redefining the appropriate label to the last node by using the user information of the last endplate location and correcting the labeling of the previous nodes accordingly by backtracking toward the first node.

Referring to FIG. 12A, the upper vertebra is T10 and lower vertebra is L4. The first label (up-endplate 13) is assigned only to one point called first node for the first endplate (information given by the user) while the other labels (down-endplate 12 to down-endplate 0) are assigned to an interval of points, thus determining by accumulating standard deviations, several nodes. So, several labels have been assigned to the last u-coordinate that corresponds to the up-endplate of the last vertebra, whereas the appropriate label that corresponds to the exact location of said last vertebra is already known from the information given by the user. A backtracking is started on the appropriate u-coordinate of the upper-endplate of the last vertebra and the labeling of the previous nodes are corrected accordingly while performing said back-tracking toward the first node.

The energy functions used to calculate the cost of the path for this DP2 are:

A local cost, which is the value of the down-endplates cost-profile and up-endplates cost-profile respectively for the nodes with label even and odd.

A transition cost, which is the cost associated to two nodes denoted by S1, and S2, having V1 and V2 as labels and which is very high if the transition is impossible [For instance: V2 (lower vertebra)>V1 (upper vertebra)] or equal to the value given by:

$$1/F\text{cost}(S2, S1, \text{sigma } 2, avS2)$$

where Fcost is a cost function returning a cost according to: the u-coordinate of the node S2 denoted by u(S1); the u-coordinate of the node S1 denoted by u(S2); the theoretical distance d2 between S2 and its predecessor endplate location denoted by avS2; the standard deviation of this theoretical distance denoted by sigma 2. A bell shaped function Fcost is illustrated in FIG. 12B. The function shows a minimum cost when the distance between the endplates S1 and S2 is closer to the theoretical distance.

4) Adding Guide-Points: The results are illustrated in FIG. 13A with the center line in black, the outline and the endplates in white. There are three points where the algorithm is mistaken. In numbers 1 and 2, the gradient of the pedicles is stronger than the gradient of the endplates, whereas in number 3, the smoothness constraint of the outline has forced a wrong solution. The user is allowed to interact to modify the final results. One modification in one step of the method involves computing again the previous results to find an optimized solution. FIG. 13B shows the results on the image after the introduction of three guide points indicated by arrows. After the extraction of the endplates, in a phase of validation, the results of the DP are checked in order to determine whether the points given by the user have correctly been used.

IV) Detection of the corners of the vertebra.

The corners of the vertebra are to be found as the final extremes of the endplates, at the intersection of endplates and outlines, shown as white crosses on FIG. 14. Guide points can be introduced by the user on the up-corners or down-corners of the vertebra. After the introduction of a new guide point, the spine outline must be computed again because the corners guide points belong also to the outline. When one corner is introduced, the cost of the points around it takes a very high value in order to create a minimum in this guide point and force the path to go through it. Thus the curve of FIG. 10 is modified. It becomes less noisy and the locations of the useful minimum are clearer. The steps of the method are repeated until the result is correct. A sample of final result is shown in FIG. 14.

Referring to FIG. 15, a medical examination apparatus 150 comprises means for acquiring digital image data of a sequence of images, and a digital processing system 120 for processing these data according to the processing method described above. The medical examination apparatus comprises means for providing image data to the processing system 120 which has at least one output 106 to provide image data to display and/or storage means 130, 140. The display and storage means may respectively be the screen 140 and the memory of a workstation 110. Said storage means may be alternately external storage means. This image processing system 120 may be a suitably programmed computer of the workstation 130, or a special purpose processor having circuit means such as LUTs, Memories, Filters, Logic Operators, that are arranged to perform the functions of the method steps according to the invention. The workstation 130 may also comprise a keyboard 131 and a mouse 132.

What is claimed is:

1. A method for extracting geometrical data from a 2-D digital image of the spine, comprising:
   digitizing a spine center line and end points of said spine center line;
   constructing a 2-D Rectangular-Band around said spine center line; and
   processing the 2-D Rectangular-Band image data in order to estimate best paths going through selected points for determining spine outlines, wherein determining the spine outlines comprises estimating the best paths as lowest cost paths linking points selected by a contour detection operation optimizing a cost function composed of a local cost favoring the points having intensity characteristics that are optimum in the direction orthogonal to the spine centerline and a transition cost which constrains the path to go smoothly from one point to a next point.

2. A method as claimed in claim 1, wherein the steps for constructing the Rectangular-Band comprises:
   constructing, in the 2-D digital image, a 2-D image band, referred to as Rubber-Band, whose center line is a spline representing the spine center line, and unfolding said Rubber-Band for constructing a 2-D Rectangular-Band; and
   calculating the intensities of the points of the Rectangular-Band from the intensities of the corresponding points of the Rubber-Band.

3. A method as claimed in claim 1, wherein a prior knowledge relating to spine vertebra width and to spine length is used to optimize the local cost.

4. A method as claimed in claim 1, wherein digitized guide-points are added to the found outline points to compel the best paths to go through them.

5. A method as claimed in claim 1, further comprising steps of processing said 2-D rectangular image band image data in order to estimate spine endplates locations using the data of one corresponding found spine outline.

6. A method as claimed in claim 5, further comprising steps of determining points of the spine, referred to as corners of vertebrae, located at the intersection of the outlines and the endplates.

7. A method as claimed in claim 6, further comprising steps of digitizing guide points that are set on the corners of the vertebrae to improve the labeling of the nodes.

8. A method as claimed in claim 1, comprising previous normalization of the point gradients within a range of gradient values to compensate for possible undue differences of brightness in regions of the original image.

9. An imaging system having acquisition means for acquiring images of the spine, having display means to display said images, having interactive drawing means to digitize the spine center line, the end points and guide points, having storage means to store the initial knowledge and database knowledge, storage means to store image data, and having processing means to carry out a method as claimed in claim 1.

10. An imaging system as claimed in claim 9, wherein the processing means comprise a suitably programmed computer of a workstation or a special purpose processor having circuit means, which are arranged to process the image data, and wherein the display means displays the processed images.

11. A medical examination apparatus having the system of claim 9.

12. A computer program product comprising a set of instructions stored in computer readable medium for carrying out the method as claimed in claim 1.

13. A method for extracting geometrical data from a 2-D digital image of the spine, comprising:

digitizing a spine center line and end points of said spine center line;

constructing a 2-D Rectangular-Band around said spine center line; and processing the 2-D Rectangular-Band image data in order to estimate best paths going through selected points for determining spine outlines, further comprising processing said 2-D rectangular image band image data in order to estimate spine endplates locations using the data of one corresponding found spine outline, wherein processing said 2-D rectangular image band image data further comprise:

starting from the points of said corresponding found outline and determining twice the best path to reach the spine center line, a first time in following a upward edge gradient direction and a second time in following a downward edge gradient direction, and storing the costs relating to said best paths.

14. A method as claimed in claim 13, wherein the best path to reach the spine centerline is estimated by a contour detection operation optimizing a cost function composed of a local cost favoring the points having intensity gradients that are optimum in the direction parallel to the spine centerline and a transition cost which constrains the path to go smoothly from one point to a next point.

15. A method as claimed in claim 13, further comprising steps of:

constructing a first and a second cost profiles for the upward and downward directions, at locations along the spine center line, determining the up-endplates and down-endplates locations as respective minimum of the first and the second cost profiles, said locations being referred to as nodes.

16. A method as claimed in claim 15, for determining the respective nodes of the cost profiles, comprising steps of:

adding initial knowledge of the number of endplates and of the location of the endplates of a first considered vertebra and of a last considered vertebra in the image, said locations being defined by points digitized on the spine centerline, defining intervals, along the spine centerline, where it is probable to find an endplate, in the first and the second profiles, and defining standard deviations with respect to said intervals, using a database knowledge, assigning a label of first endplate to the first node, and labeling progressively the nodes to the last endplate, thus determining by accumulating standard deviations, several nodes to said last endplate, redefining the appropriate label to the last node by using the initial knowledge of the last endplate location and correcting the labeling of the previous nodes accordingly by backtracking toward the first node.

\* \* \* \* \*